No. 642,789. Patented Feb. 6, 1900.
W. FREEMAN.
SUSPENDERS.
(Application filed Aug. 23, 1899.)
(No Model.)

WITNESSES
Jas. E. Hutchinson
G. F. Downing

INVENTOR
William Freeman
By H. A. Seymour
Attorney

THE NORRIS PETERS CO., PHOTO-LITHO., WASHINGTON, D. C.

UNITED STATES PATENT OFFICE.

WILLIAM FREEMAN, OF NEW YORK, N. Y.

SUSPENDERS.

SPECIFICATION forming part of Letters Patent No. 642,789, dated February 6, 1900.

Application filed August 23, 1899. Serial No. 728,233. (No model.)

*To all whom it may concern:*

Be it known that I, WILLIAM FREEMAN, of New York city, in the county of New York and State of New York, have invented certain new and useful Improvements in Suspenders; and I do hereby declare the following to be a full, clear, and exact description of the invention, such as will enable others skilled in the art to which it appertains to make and use the same.

My invention relates to an improvement in suspenders, and more particularly to the guide-frame uniting the several sections of the back cord, the object of the invention being to so construct said frame as to result in cheapness of manufacture without detracting from its efficiency to properly guide the sections of the back cord.

With this end in view my invention consists in certain novel features of construction and combinations of parts, as will be hereinafter more fully described, and pointed out in the claim.

Figure 1:
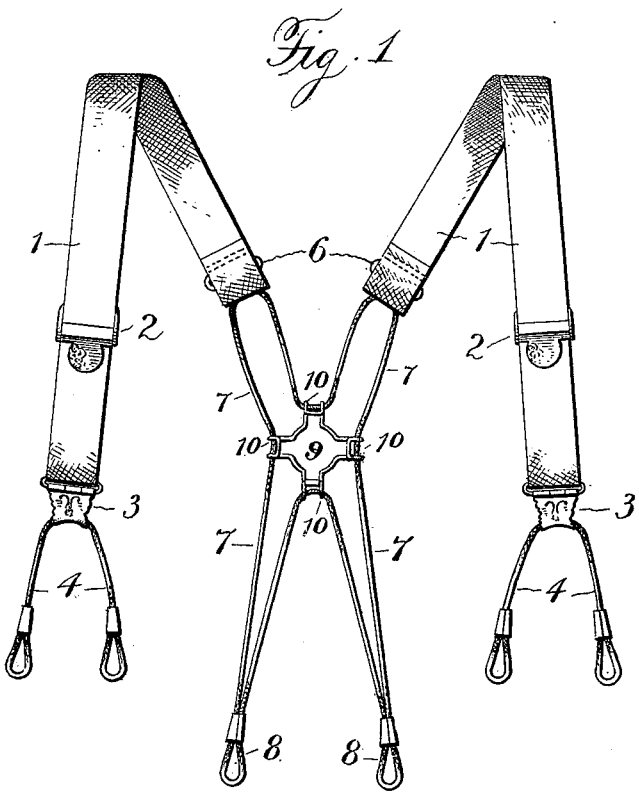
Figure 2:
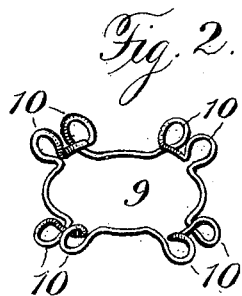

In the accompanying drawings, Figure 1 is a view of a pair of suspenders embodying my improvement, and Fig. 2 is a detailed perspective view of the guide-frame.

1 represents the ordinary shoulder-straps, each of which is provided at its front end with a buckle 2 for adjusting the same, and each shoulder-strap carries at its looped front end a metal loop 3 for the accommodation of the buttonhole-cord 4. The shoulder-straps are provided near their rear ends with loops carrying eyelets 6, and the extreme rear ends of the shoulder-straps project beyond said eyelets to form cushions for the latter and prevent them from coming in contact with the shirt of the wearer. A cord 7 passes through the eyelets 6 at the rear ends of the shoulder-straps and is provided with loops 8 for attachment to the rear buttons of the trousers. The top, side, and bottom sections of the cord 7 are connected by a guiding-frame 9. The frame 9 is made of a single piece of stout wire, which is bent at several points to form an annular series of outwardly-projecting loops 10, and the ends of the wire are welded, brazed, or otherwise permanently secured together, said connection preferably constituting the cross-bar of one of said loops. Each loop 10 is bent inwardly, so as to form two eyelets, which aline with each other for the accommodation and free passage of back cord 7, the respective sections of which pass through the respective pairs of eyelets, as clearly shown in Fig. 1. The portions of the wire frame between the loops 10 may be slightly curved, as shown in Fig. 2, or these portions may be made straight and the frame may be made rectangular in general form instead of square without departing from the spirit or limiting the scope of my invention.

Having fully described my invention, what I claim as new, and desire to secure by Letters Patent, is—

A pair of suspenders comprising shoulder-straps, an open frame made of a single piece of wire, the wire composing said frame projecting outwardly at four points, each outwardly-projecting portion of the frame bent upon itself so as to form a pair of eyelets in line with each other, a cord passing freely through the upper pair of eyelets and then connected with the rear portions of the respective shoulder-straps, and then passing down freely through the lateral pairs of eyelets at respective sides of the frame, loops at the lower ends of said cord and a portion of the cord between said loops passing through the lower pair of eyelets of the wire frame.

In testimony whereof I have signed this specification in the presence of two subscribing witnesses.

WILLIAM FREEMAN.

Witnesses:
WILLIAM S. FOULK,
CHARLES VON EIFF.